(12) United States Patent
Iwatani et al.

(10) Patent No.: US 12,280,504 B2
(45) Date of Patent: Apr. 22, 2025

(54) ROBOT CONTROL METHOD (71) Applicant: Panasonic Intellectual Property Management Co., Ltd., Osaka (JP)

(72) Inventors: Masayoshi Iwatani, Osaka (JP); Hiroyuki Nakata, Osaka (JP); Hiroyoshi Ueda, Osaka (JP); Atsumi Hashimoto, Osaka (JP); Yasuyoshi Honuchi, Osaka (JP); Ryosuke Yamamoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 389 days.

(21) Appl. No.: 17/674,902

(22) Filed: Feb. 18, 2022

(65) Prior Publication Data

US 2022/0168891 A1 Jun. 2, 2022

Related U.S. Application Data (63) Continuation of application No. PCT/JP2020/039672, filed on Oct. 22, 2020.

(30) Foreign Application Priority Data

Nov. 5, 2019 (JP) .................. 2019-200787

(51) Int. Cl.
*B25J 9/16* (2006.01)
(52) U.S. Cl.
CPC ........... *B25J 9/1638* (2013.01); *B25J 9/1612* (2013.01); *B25J 9/163* (2013.01); *B25J 9/1664* (2013.01)

(58) Field of Classification Search
CPC ........ B25J 9/1638; B25J 9/1612; B25J 9/163; B25J 9/1664; B25J 9/1641; B25J 9/10;
(Continued)

(56) References Cited

U.S. PATENT DOCUMENTS 4,919,586 A * 4/1990 Derby .................. B25J 15/0095
901/45
7,946,800 B2 * 5/2011 Hosek ............... H01L 21/67742
414/744.5

(Continued)

FOREIGN PATENT DOCUMENTS

JP  7-088789   4/1995
JP  2000-176869  6/2000

(Continued)

OTHER PUBLICATIONS

International Search Report of PCT application No. PCT/JP2020/039672 dated Dec. 22, 2020.

(Continued)

*Primary Examiner* — Sihar A Karwan
(74) *Attorney, Agent, or Firm* — Wenderoth, Lind & Ponack, L.L.P.

(57) ABSTRACT

When workpiece (W) is brought into a non-gripping state after deflection compensation of robot arm (10) is performed in a gripping state of workpiece (W), the deflection compensation of robot arm (10) is performed in a non-gripping state of workpiece (W). Here, the deflection compensation of robot arm (10) in the non-gripping state of workpiece (W) is performed while a compensation amount is changed to gradually decrease, while hand (18) is moved from a first teaching point to a second teaching point.

7 Claims, 8 Drawing Sheets (58) Field of Classification Search
CPC ........... G05B 2219/39186; G05B 2219/39176; G05B 2219/43058
See application file for complete search history.

(56) References Cited

U.S. PATENT DOCUMENTS

| | | | | |
|---|---|---|---|---|
| 8,752,449 | B2* | 6/2014 | Hofmeister | B25J 11/0095 414/744.5 |
| 2006/0048364 | A1* | 3/2006 | Zhang | B23Q 17/0966 29/709 |
| 2006/0060573 | A1* | 3/2006 | Becker | B23K 26/0884 219/121.64 |
| 2006/0161299 | A1* | 7/2006 | Cho | B25J 9/1638 700/245 |
| 2006/0216137 | A1* | 9/2006 | Sakata | H01L 21/67766 414/222.13 |
| 2009/0204260 | A1* | 8/2009 | Bryne | B05B 13/0292 901/43 |
| 2010/0178124 | A1* | 7/2010 | Dickerson | B23Q 16/00 409/141 |
| 2010/0185324 | A1* | 7/2010 | Ferrara | B25J 9/1641 700/245 |
| 2010/0332032 | A1* | 12/2010 | Moriyama | B25J 9/1633 700/258 |
| 2014/0017048 | A1* | 1/2014 | Mattern | B25J 9/0084 414/730 |
| 2014/0025197 | A1* | 1/2014 | Mattern | B25J 13/08 700/218 |
| 2015/0051735 | A1* | 2/2015 | Tanaka | B25J 9/1638 700/262 |
| 2015/0066196 | A1* | 3/2015 | Wooldridge | G01B 21/045 700/195 |
| 2015/0272535 | A1* | 10/2015 | Joson | G06T 11/008 378/207 |
| 2016/0136709 | A1* | 5/2016 | Naderer | B21D 19/04 72/214 |
| 2018/0272535 | A1* | 9/2018 | Ogawa | B25J 13/085 |
| 2018/0326507 | A1* | 11/2018 | Halvorsen | B25H 1/0035 |
| 2019/0224846 | A1* | 7/2019 | Pivac | G05B 19/416 |
| 2020/0130181 | A1* | 4/2020 | Nakata | B25J 9/1694 |
| 2021/0192784 | A1* | 6/2021 | Taylor | B25J 9/1612 |
| 2022/0072702 | A1* | 3/2022 | Ueda | B25J 9/1638 |

FOREIGN PATENT DOCUMENTS

| | | |
|---|---|---|
| WO | 2005/002804 | 1/2005 |
| WO | 2019/012942 | 1/2019 |

OTHER PUBLICATIONS

Extended European Search Report issued Nov. 16, 2022 in corresponding European Patent Application No. 20885590.8.
The Indian Office Action issued Aug. 20, 2024 in corresponding Indian Patent Application No. 202247018265, with English translation.

* cited by examiner

ROBOT CONTROL METHOD

This application is a continuation of the PCT International Application No. PCT/JP2020/039672 filed on Oct. 22, 2020, which claim the benefit of foreign priority of Japanese patent application No. 2019-200787 filed on Nov. 5, 2019, the contents all of which are incorporated herein by reference.

TECHNICAL FIELD

The present disclosure relates to a robot control method.

BACKGROUND ART

Conventionally, a robot control method that drives each joint of a robot based on teaching data has been known (see, for example, Patent Literatures 1 and 2). Here, because the robot is driven via a speed reducer provided in the joint, there is a problem that the speed reducer and a bearing are elastically deformed to cause deflection in an arm and an absolute positional accuracy becomes difficult to be ensured.

Patent Literature 1 discloses a configuration in which load information is added to each piece of teaching point data, and deflection compensation is performed while a compensation amount for each teaching point is switched according to the load information.

Patent Literature 2 discloses a configuration in which teaching points are created according to the presence of a gripped object, and a robot is operated based on teaching point data to which information on the presence of the gripped object is added.

CITATION LIST

Patent Literature

PTL 1: Unexamined Japanese Patent Publication No. H07-88789
PTL 2: Unexamined Japanese Patent Publication No. 2000-176869

SUMMARY OF THE INVENTION

Technical Problem

Meanwhile, in the conventional invention, malfunction possibly occurs if the actual gripping state of a workpiece and the switching timing of the compensation amount of the arm are not appropriate.

Specifically, when a delay occurs in the opening operation of the hand at the time of opening the hand after the workpiece is placed on a workbench, the compensation amount of the arm is switched in the state of the hand still gripping the workpiece. As a result, there is a risk that the workpiece is damaged by being pressed against the workbench.

Therefore, it is conceivable to wait for a predetermined time after an opening command of the hand is output and switch the compensation amount of the arm after the opening operation of the hand is securely performed.

However, if the workpiece is a heavy object and the compensation amount of the arm is large, the acceleration of the arm generated based on the change in the compensation amount also becomes large. In this case, the arm possibly moves by a width equal to or larger than the compensation amount, and there is a risk of the hand coming into contact with the workbench.

The present disclosure has been made in view of the above point, and an object of the present disclosure is to suppress a malfunction that occurs when deflection of an arm is compensated after a workpiece is brought into a non-gripping state.

Solution to Problem

The present disclosure is directed to a robot control method of operating an arm of a robot having a plurality of joints based on a predetermined operation program, and has taken the following solution.

That is, a first aspect of the invention includes:
compensating deflection generated in an arm by operating a joint based on a predetermined compensation amount, the deflection being generated by the arm gripping a workpiece with a gripping part of the arm;
moving the workpiece to a first teaching point;
opening the gripping part at the first teaching point to bring the workpiece into a non-gripping state; and
operating the joint while the compensation amount is changed to gradually decrease in the non-gripping state of the workpiece and while the gripping part is moved from the first teaching point to the second teaching point.

In the first aspect of the invention, when the workpiece is brought into the non-gripping state after the deflection compensation of the arm is performed in the gripping state of the workpiece, the deflection compensation of the arm is performed in the non-gripping state of the workpiece. Here, the deflection compensation of the arm in the non-gripping state of the workpiece is performed while a compensation amount is changed to gradually decrease, while the gripping part is moved from the first teaching point to the second teaching point.

As a result, a malfunction that occurs when the deflection of the arm is compensated after the workpiece is brought into the non-gripping state can be suppressed.

Specifically, when the joint is rapidly moved based on the compensation amount in order to perform deflection compensation for the arm in the non-gripping state of the workpiece after the gripping part is opened and the workpiece is brought into the non-gripping state, there is a risk that the acceleration of the arm increases and the arm collides with the workbench or the like.

On the other hand, in the present disclosure, the compensation amount is gradually decreased according to the elapsed time or the movement amount of the arm while the gripping part is moved from the first teaching point to the second teaching point. As a result, when the workpiece is brought from the gripping state to the non-gripping state, the compensation amount of the arm can be gently varied, and unintended movement of the arm can be suppressed.

In a second aspect of the invention according to the first aspect,
the compensation amount includes a first compensation amount in a gripping state of the workpiece, a second compensation amount in the non-gripping state of the workpiece, and a third compensation amount continuously changing between the first compensation amount and the second compensation amount, and
the third compensation amount changes linearly from the first compensation amount toward the second compensation amount.

In the second aspect of the invention, the deflection compensation of the arm is performed based on the third compensation amount that linearly changes so as to gradually decrease from the first compensation amount toward the second compensation amount.

As a result, when the workpiece is brought from the gripping state to the non-gripping state, the compensation amount of the arm can be gently varied, and unintended movement of the arm can be suppressed.

In a third aspect of the invention according to the second aspect, the third compensation amount changes in a curved shape at a boundary position between the first compensation amount and the third compensation amount and at a boundary position between the third compensation amount and the second compensation amount.

In a third aspect of the invention, the boundary position between the first compensation amount and the third compensation amount and the boundary position between the third compensation amount and the second compensation amount change in a curved shape.

As a result, when the workpiece is brought from the gripping state to the non-gripping state, the compensation amount of the arm can be more gently varied, and unintended movement of the arm can be suppressed.

In a fourth aspect of the invention according to the second or third aspect, the joint is operated based on a fourth compensation amount that changes more gently than the third compensation amount, in a case where a time from when the workpiece is brought into the non-gripping state to when the gripping part starts to move from the first teaching point to the second teaching point is shorter than a predetermined time.

In the fourth aspect of the invention, in the case where the time until the gripping part starts to move after the workpiece is brought into the non-gripping state is short, the deflection compensation of the arm is performed based on the fourth compensation amount that changes more gently than the third compensation amount.

As a result, when the workpiece is brought from the gripping state to the non-gripping state, the compensation amount of the arm can be more gently varied, and unintended movement of the arm can be suppressed.

In a fifth aspect of the present invention according to any one of the second to fourth aspects, the joint is operated based on a fourth compensation amount that changes more gently than the third compensation amount, in a case where a distance between the gripping part and the first teaching point is shorter than a predetermined distance.

In the fifth aspect of the invention, in the case where the distance between the gripping part and the first teaching point is short, the deflection compensation of the arm is performed based on the fourth compensation amount that changes more gently than the third compensation amount.

As a result, when the workpiece is brought from the gripping state to the non-gripping state, the compensation amount of the arm can be more gently varied, and unintended movement of the arm can be suppressed.

In a sixth aspect of the present invention according to any one of the first to fifth aspects, the arm has an acceleration within a range of allowable acceleration of the arm, the acceleration being generated based on a change in the compensation amount.

In the sixth aspect of the invention, the acceleration of the arm generated based on the change in the compensation amount is set within the range of the allowable acceleration of the arm. As a result, the arm can be suppressed from moving by a width exceeding the compensation amount.

Advantageous Effect of Invention

According to the present disclosure, it is possible to suppress a problem that occurs when the deflection of the arm is compensated after the workpiece is brought into the non-gripping state.

DESCRIPTION OF EMBODIMENT

An exemplary embodiment of the present disclosure is described below with reference to the drawings. Note that the following description of the preferred exemplary embodiment is merely exemplary in nature, and is not intended to limit the present disclosure, its application, or its use.

Figure 1:
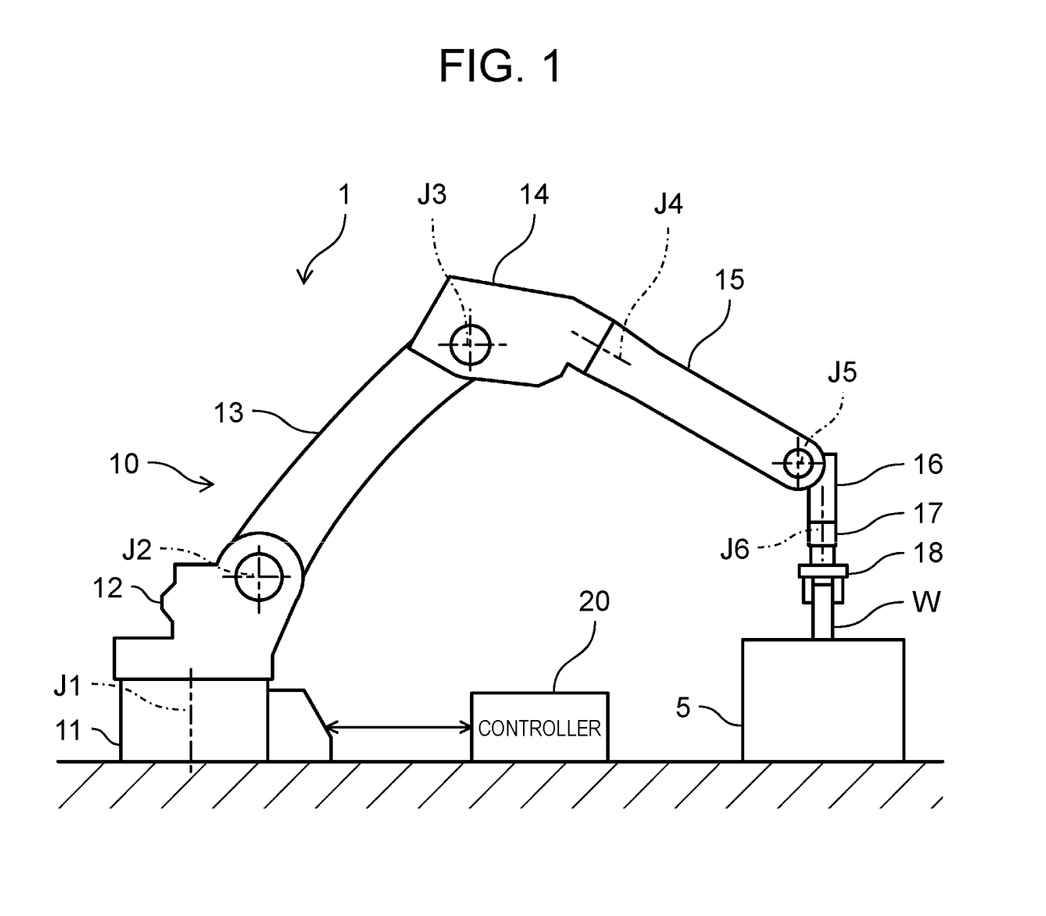
FIG. 1 is a side view illustrating a configuration of a robot according to the present exemplary embodiment.

As illustrated in FIG. 1, robot 1 includes six-axis articulated robot arm 10 and controller 20 that controls the operation of robot arm 10. Robot 1 transfers workpiece W to and from workbench 5.

Robot arm 10 includes base 11, shoulder 12, lower arm 13, first upper arm 14, second upper arm 15, wrist 16, and attaching part 17.

Shoulder 12 is supported on base 11 so as to be turnable in the horizontal direction about first joint J1. Lower arm 13 is supported on shoulder 12 so as to be turnable in the vertical direction about second joint J2.

First upper arm 14 is supported on lower arm 13 so as to be turnable in the vertical direction about third joint J3. Second upper arm 15 is supported on the tip of first upper arm 14 so as to be torsionally rotatable about fourth joint J4.

Wrist 16 is supported on second upper arm 15 so as to be turnable in the vertical direction about fifth joint J5. Attaching part 17 is supported on wrist 16 so as to be torsionally rotatable about sixth joint J6. Hand 18 (gripping part) that grips workpiece W is attached to attaching part 17.

An unillustrated actuator is built in each of first joint J1 to sixth joint J6. Controller 20 controls driving of the actuators of first joint J1 to sixth joint J6 based on an operation program input in advance by teaching or the like so that first joint J1 to sixth joint J6 reach target positions (command angles), respectively.

Robot arm 10 moves workpiece W gripped by hand 18 to a first teaching point of workbench 5, opens hand 18 at the first teaching point, and brings workpiece W into the non-gripping state. Thereafter, robot arm 10 moves hand 18 toward a second teaching point positioned away from the first teaching point in the non-gripping state of workpiece W.

Incidentally, in articulated robot 1 as described above, robot arm 10 is deflected and deformed in the direction of gravity by the weight of robot arm 10, the weight of hand 18 at the tip of robot arm 10, and the load weight of workpiece W.

Specifically, unillustrated speed reducers and bearings are provided in first joint J1 to sixth joint J6, and robot arm 10 is deflected by elastic deformation of the speed reducers and the bearings, and the tip of hand 18 is deviated from the target position.

Therefore, in robot arm 10 according to the present exemplary embodiment, this deflection is eliminated in consideration of the static elastic deflection generated in second joint J2 and third joint J3 turnable in the gravity direction.

More specifically, the gravitational torque acts on second joint J2 and third joint J3 in the clockwise direction in FIG. 1, and the deflection occurs in the turning direction of the rotation shaft. Therefore, second joint J2 and third joint J3 are turned in the counterclockwise direction in FIG. 1 to cancel the deflection generated at second joint J2 and third joint J3, thereby compensating for the positional deviation generated at the tip of hand 18.

Figure 2:
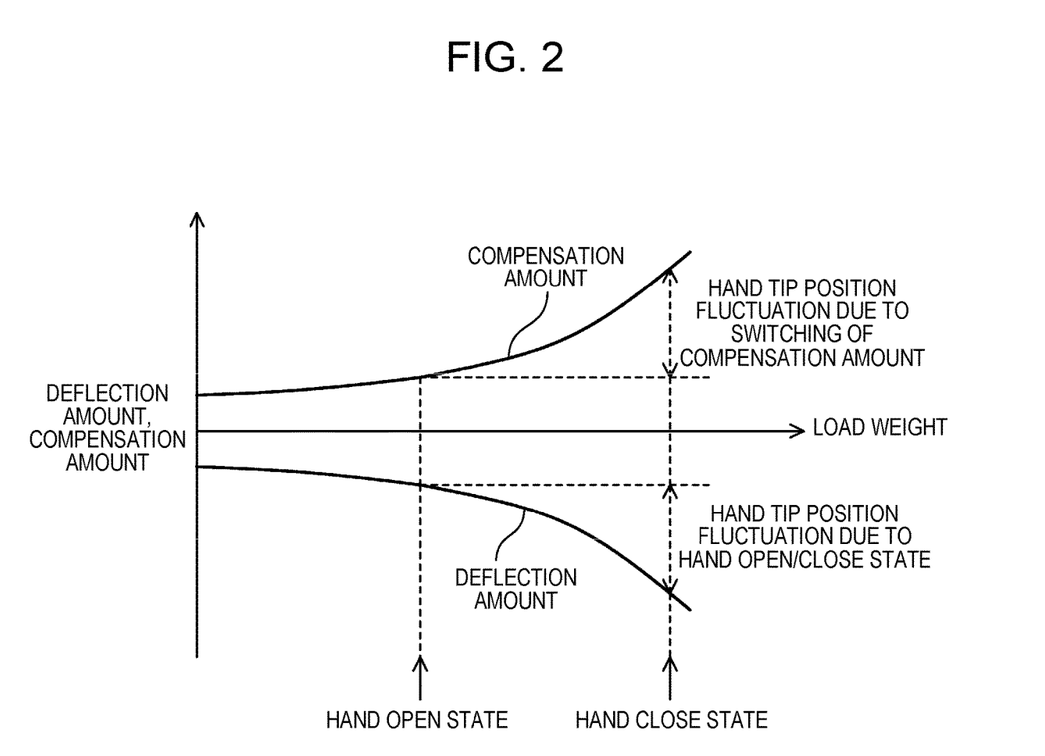
FIG. 2 is a graph showing a relationship between a load weight, a deflection amount, and a compensation amount.

As illustrated in FIG. 2, a deflection amount of robot arm 10 increases in the downward direction as the load weight of workpiece W increases. A compensation amount of robot arm 10 increases in the upward direction in order to cancel the deflection amount as the load weight of workpiece W increases.

A fluctuation range of hand 18 is larger in the state of hand 18 being closed (in the gripping state of workpiece W) than in the state of hand 18 being opened (in the non-gripping state of the workpiece W), and a variation range of the compensation amount is also larger.

When the workpiece W is transferred to the workbench 5 after workpiece W is gripped by hand 18 and the deflection compensation of robot arm 10 is performed, the tip of hand 18 is deviated by the amount of the weight of workpiece W which is no longer applied to hand 18.

Therefore, when workpiece W is in the non-gripping state, second joint J2 and third joint J3 need to be turned in order to eliminate the positional deviation of the tip of hand 18.

Figure 3:
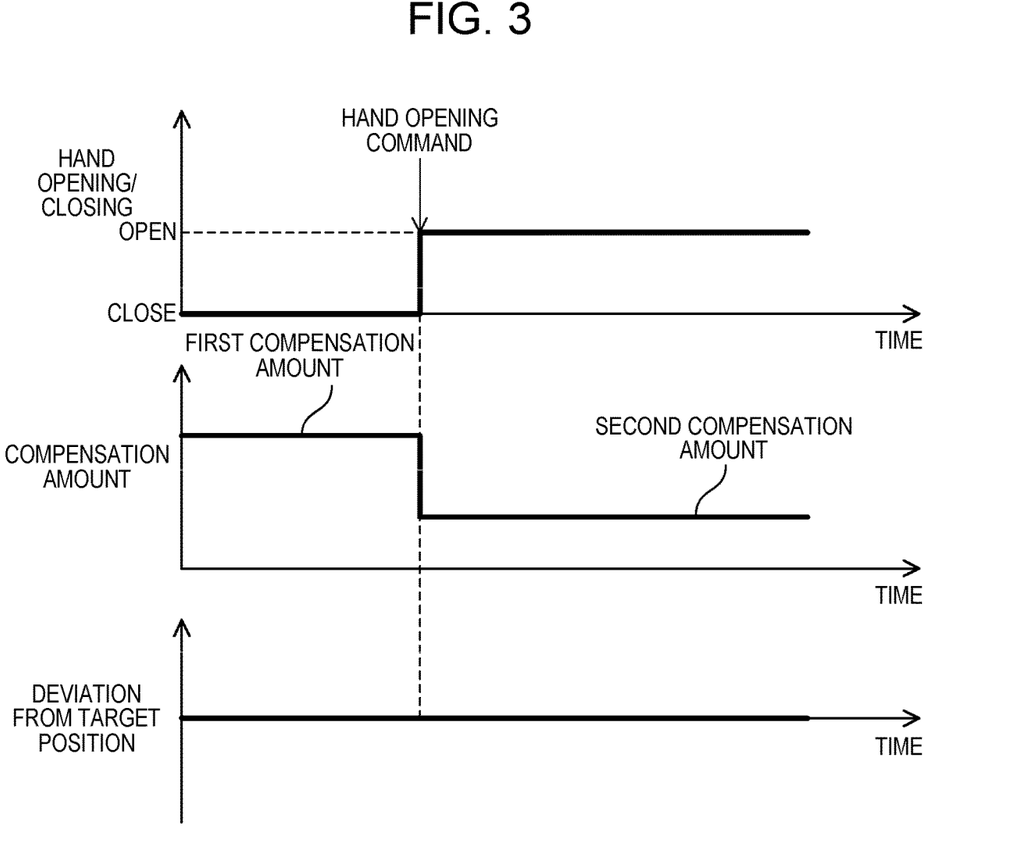
FIG. 3 is a timing chart illustrating a relationship between a hand opening/closing operation, a compensation amount, and a deviation from a target position in the case where the hand opening/closing operation is normally performed.

As shown in FIG. 3, in a state of hand 18 being closed, the deflection compensation of robot arm 10 is performed based on a first compensation amount. When an opening command of hand 18 is output and hand 18 is opened, the compensation amount is switched to a second compensation amount smaller than the first compensation amount, and the deflection compensation of robot arm 10 is performed based on the second compensation amount.

The deflection compensation of robot arm 10 based on the second compensation amount is performed by turning second joint J2 and third joint J3 in the clockwise direction in FIG. 1. That is, hand 18 is made to be lowered by the amount that hand 18 has been lifted in order to compensate for the deflection of robot arm 10 due to the weight of workpiece W.

Meanwhile, a malfunction possibly occurs if the actual gripping state of workpiece W and the switching timing of the compensation amount of robot arm 10 are not appropriate.

Figure 4:
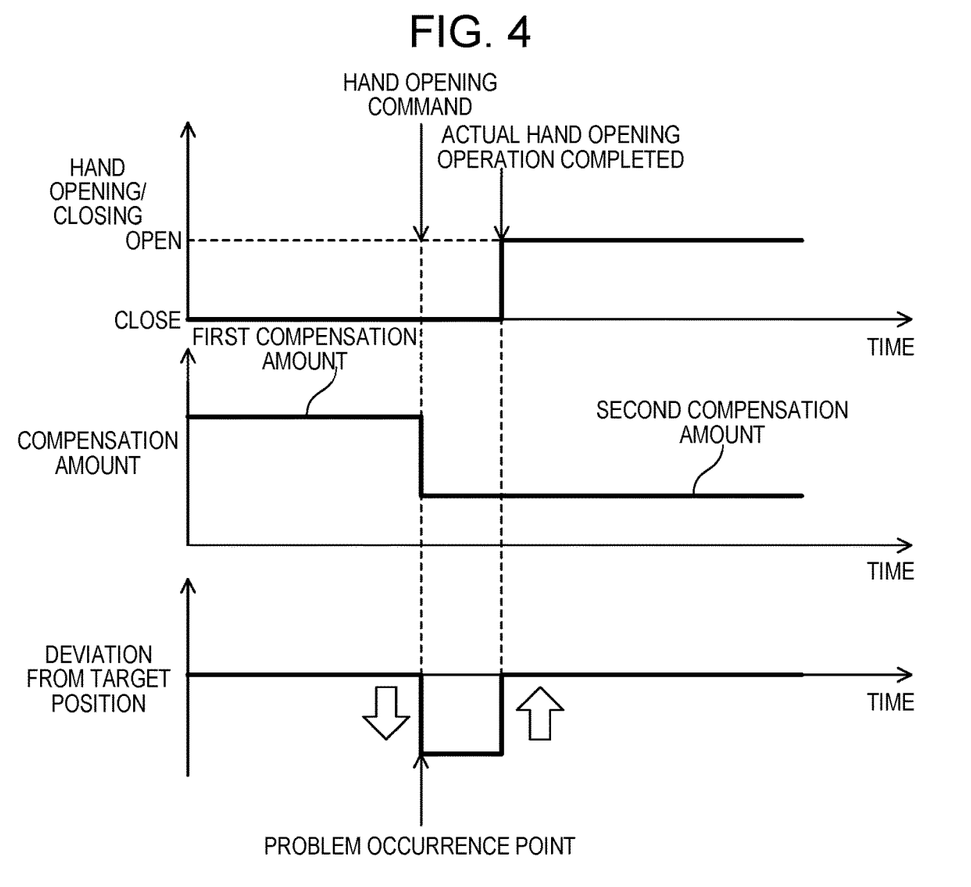
FIG. 4 is a timing chart illustrating a relationship between the hand opening/closing operation, the compensation amount, and the deviation from the target position in the case where a delay has occurred in the hand opening/closing operation.
Figure 5:
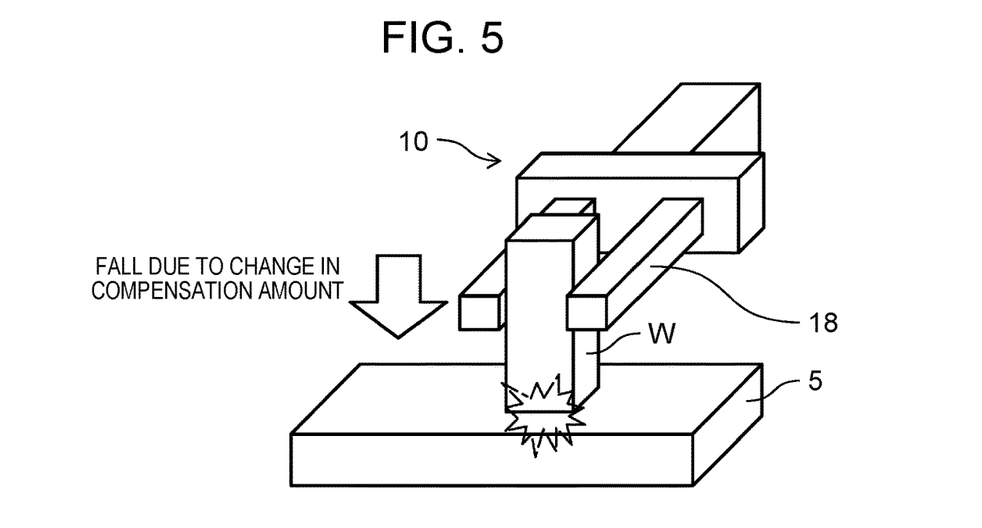
FIG. 5 is a perspective view for explaining a positional relationship between a hand, a workpiece, and a workbench when a delay has occurred in the hand opening/closing operation.

Specifically, as illustrated in FIG. 4, when a delay occurs in the opening operation of hand 18 at the time of opening hand 18 after workpiece W is placed on workbench 5, the compensation amount of robot arm 10 is switched in the state of hand 18 still gripping workpiece W. As a result, there is a risk that workpiece W is damaged by being pressed against workbench 5 (see FIG. 5).

Figure 6:
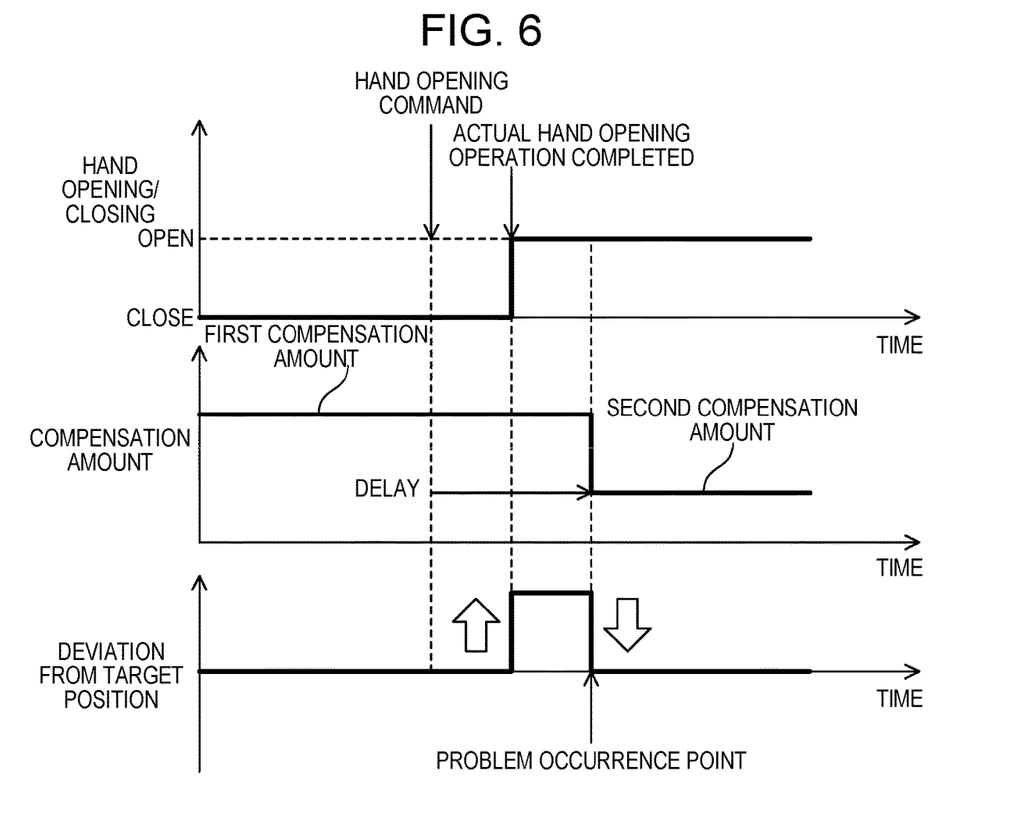
FIG. 6 is a timing chart illustrating a relationship between the hand opening/closing operation, the compensation amount, and the deviation from the target position in the case where a delay command is executed after a hand opening command is executed.

Therefore, as illustrated in FIG. 6, it is conceivable to execute a delay command and wait for a predetermined time after the opening command of hand 18 is output, and to switch the compensation amount of robot arm 10 after the opening operation of hand 18 is securely performed.

Figure 7:
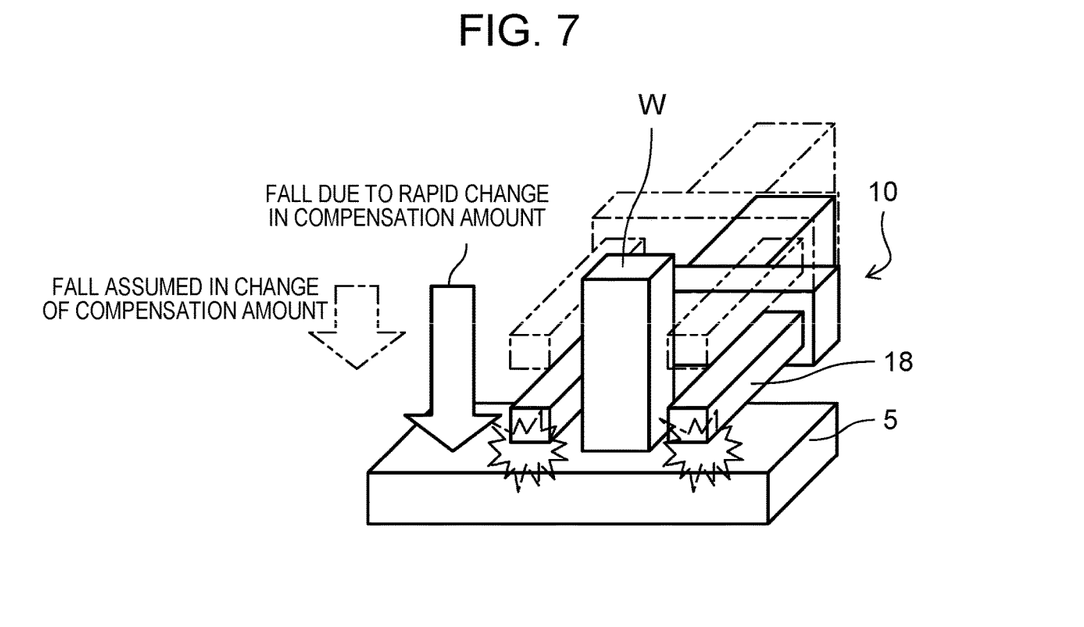
FIG. 7 is a perspective view for explaining a positional relationship between the hand, the workpiece, and the workbench in the case where the delay command is executed after the hand opening command is executed.

However, if workpiece W is a heavy object and the compensation amount of robot arm 10 is large, the acceleration of robot arm 10 generated based on the change in the compensation amount also becomes large. In this case, robot arm 10 possibly moves by a width equal to or larger than the compensation amount, and there is a risk of hand 18 coming into contact with workbench 5 (see FIG. 7).

Therefore, in the present exemplary embodiment, when workpiece W is brought from the gripping state to the non-gripping state, the compensation amount of robot arm 10 can be gently varied, and unintended movement of robot arm 10 can be suppressed.

Figure 8:
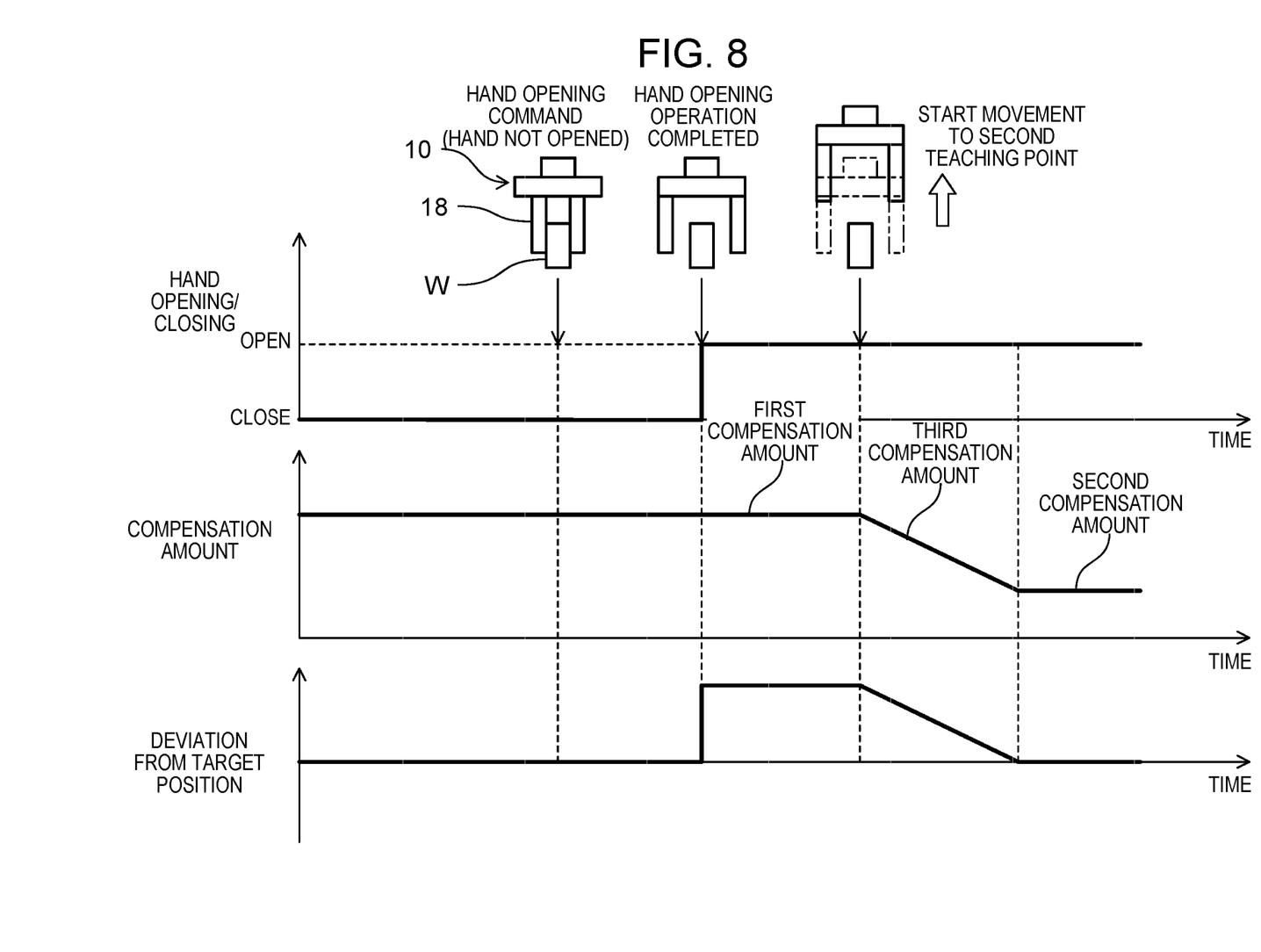
FIG. 8 is a timing chart illustrating a relationship between the hand opening/closing operation, the compensation amount, and the deviation from the target position in the case where a control method according to the present exemplary embodiment is applied.

Specifically, as illustrated in FIG. 8, workpiece W held by hand 18 is moved to the first teaching point of workbench 5. In the state of hand 18 being closed, the deflection compensation of robot arm 10 is performed based on the first compensation amount.

The delay command is executed after the opening command of hand 18 is output at the first teaching point to cause the operation to wait for a predetermined time so that the opening operation of hand 18 is securely performed.

Thereafter, in the non-gripping state of workpiece W, second joint J2 and third joint J3 are operated while the compensation amount is changed to gradually decrease, while hand 18 is moved from the first teaching point to the second teaching point.

Specifically, the compensation amount includes the first compensation amount in the gripping state of workpiece W, the second compensation amount in the non-gripping state of workpiece W, and a third compensation amount continuously changing between the first compensation amount and the second compensation amount. The third compensation amount linearly changes from the first compensation amount to the second compensation amount.

After hand 18 starts to move from the first teaching point toward the second teaching point in the non-gripping state of workpiece W, the deflection compensation of robot arm 10 is performed based on the third compensation amount until hand 18 arrives at the second teaching point.

As a result, when workpiece W is brought from the gripping state to the non-gripping state, the compensation amount of robot arm 10 can be gently varied, and unintended movement of robot arm 10 can be suppressed.

First Modification

Figure 9:
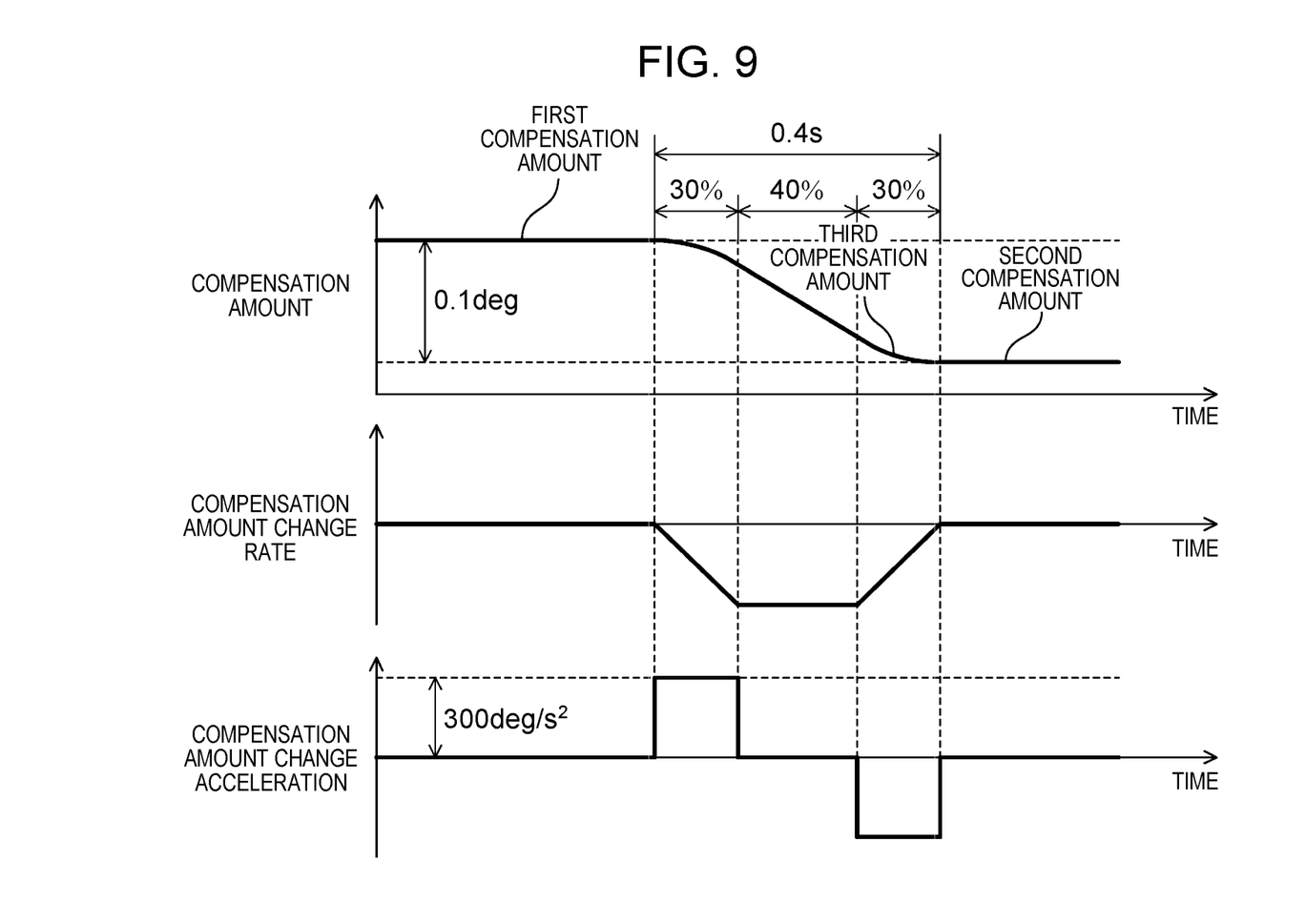
FIG. 9 is a timing chart illustrating a relationship between the compensation amount, a compensation amount change rate, and a compensation amount change acceleration in the case where a control method according to a first modification is applied.

As illustrated in FIG. 9, in a first modification, the compensation amount while hand 18 is moved from the first teaching point to the second teaching point is changed by a change amount different from that in the exemplary embodiment.

Specifically, the compensation amount includes the first compensation amount in the gripping state of workpiece W, the second compensation amount in the non-gripping state of workpiece W, and a third compensation amount continuously changing between the first compensation amount and the second compensation amount.

The third compensation amount linearly changes from the first compensation amount to the second compensation amount. Also, in the third compensation amount, a boundary position between the first compensation amount and the third compensation amount and a boundary position between the third compensation amount and the second compensation amount change in a curved shape.

After hand 18 starts to move from the first teaching point toward the second teaching point in the non-gripping state of workpiece W, the deflection compensation of robot arm 10 is performed based on the third compensation amount until hand 18 arrives at the second teaching point.

As a result, when workpiece W is brought from the gripping state to the non-gripping state, the compensation amount of robot arm 10 can be more gently varied, and unintended movement of robot arm 10 can be suppressed.

Here, the acceleration of robot arm 10 generated based on the change in the third compensation amount is set within a range of allowable acceleration of robot arm 10. Specifically, in the case of the compensation amount being 0.1° and the maximum allowable acceleration is 300°/s², the changing time of the compensation amount is set to 0.4 seconds.

Assuming that the entire changing time (0.4 seconds) of the compensation amount is 100%, the compensation amount is changed such that a curved section at the boundary position between the first compensation amount and the third compensation amount is 30%, a straight line section of the third compensation amount is 40%, and a curved section at the boundary position between the third compensation amount and the second compensation amount is 30%.

As a result, the compensation amount of the robot arm 10 can be more gently varied, and the robot arm 10 can be suppressed from operating with a width exceeding the compensation amount.

Second Modification

Figure 10:
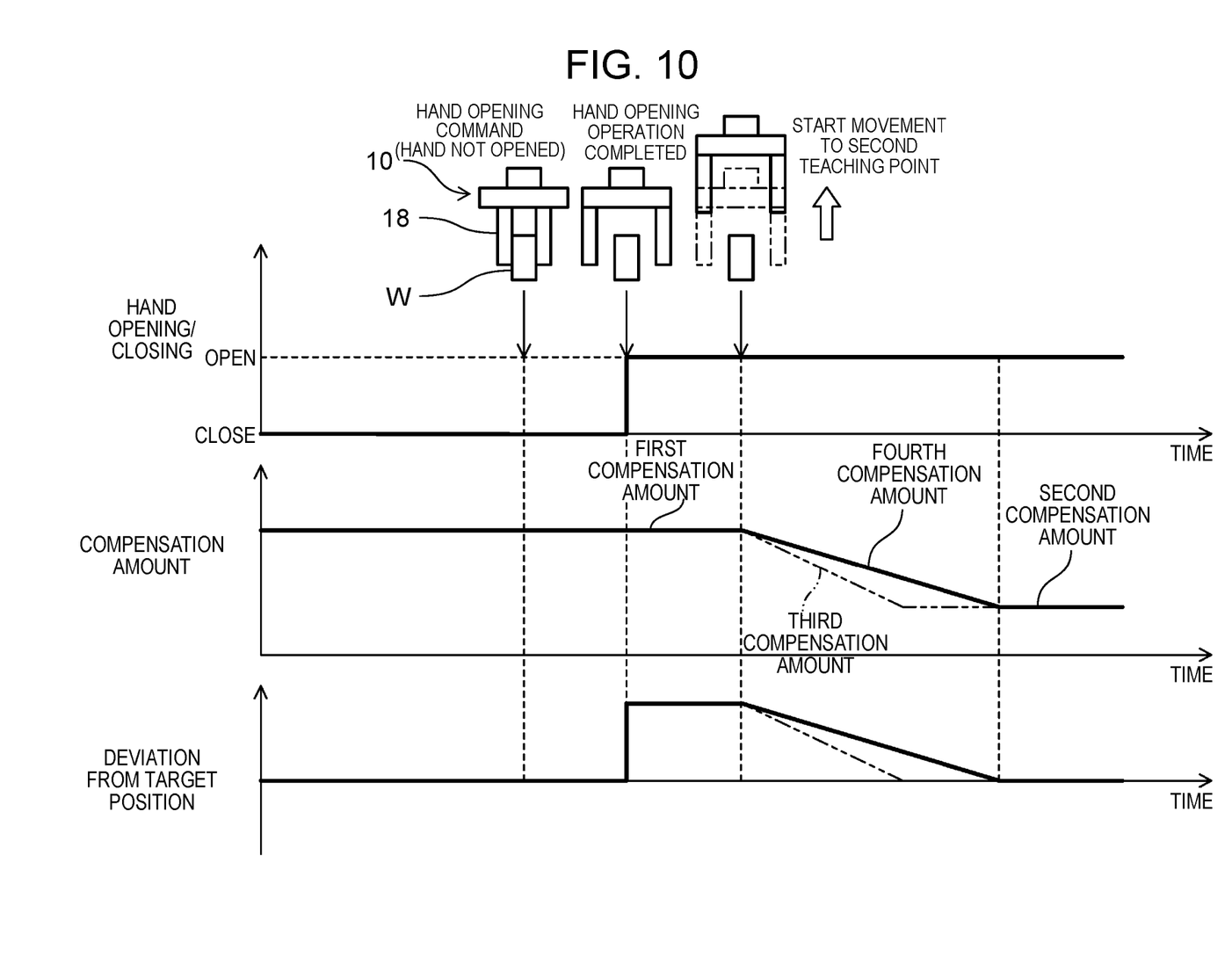
FIG. 10 is a timing chart illustrating a relationship between the hand opening/closing operation, the compensation amount, and the deviation from the target position in the case where a control method according to a second modification is applied.

As illustrated in FIG. 10, in a second modification, the time from when workpiece W is brought into the non-gripping state to when hand 18 starts to move from the first teaching point to the second teaching point is shorter than that in the exemplary embodiment.

In this case where the time until hand 18 starts to move from the first teaching point to the second teaching point is shorter than a predetermined time, second joint J2 and third joint J3 are operated based on a fourth compensation amount that changes more gently than the third compensation amount.

As a result, when workpiece W is brought from the gripping state to the non-gripping state, the compensation amount of robot arm 10 can be more gently varied, and unintended movement of robot arm 10 can be suppressed.

In the case where the distance between hand 18 and the first teaching point is shorter than a predetermined distance, there is a risk that hand 18 collides with workbench 5 when hand 18 is rapidly moved. Therefore, similarly in the case of the distance between hand 18 and the first teaching point being short, second joint J2 and third joint J3 are preferably operated based on the fourth compensation amount that changes more gently than the third compensation amount (see FIG. 10).

INDUSTRIAL APPLICABILITY

As described above, the present disclosure is extremely useful and has high industrial applicability by the fact of being able to exhibit a highly practical effect of suppressing the malfunction that occurs when the deflection of the arm is compensated after the workpiece is brought into the non-gripping state.

REFERENCE MARKS IN THE DRAWINGS

1 robot
10 robot arm
18 hand (gripping part)
J1 first joint
J2 second joint
J3 third joint
J4 fourth joint
J5 fifth joint
J6 sixth joint
W workpiece

The invention claimed is:

1. A method to operate an arm of a robot having a plurality of joints, the method comprising:
   gripping, by a gripping part of the arm, a workpiece to bring the workpiece into a gripping state, wherein the gripping part is attached to an attaching part supported on a wrist of the arm so as to be torsionally rotatable about a joint of the plurality of joints, and wherein a deflection compensation of the arm is performed based on a first compensation amount to suppress unintended movement of the arm;
   moving, by the arm, the workpiece gripped by the gripping part to a first teaching point;
   opening the gripping part at the first teaching point to bring the workpiece into a non-gripping state;
   executing a delay command, after the opening the gripping part, for a predetermined time;
   operating, after executing the delay command, the joint and one or more other joints of the plurality of joints while the first compensation amount is changed to decrease in the non-gripping state of the workpiece to a second compensation amount while the gripping part is moved from the first teaching point to the second teaching point, wherein the deflection compensation of the arm is performed based on the second compensation amount to suppress unintended movement of the arm, and wherein the decreasing is based on setting a changing time based on a maximum allowable acceleration of the arm, the first compensation amount and the second compensation amount.

2. The method according to claim 1, wherein
a third compensation amount changes linearly from the first compensation amount toward the second compensation amount, wherein the deflection compensation is performed based on the third compensation amount.

3. The method according to claim 2, wherein
the third compensation amount changes in a curved shape at a boundary position between the first compensation amount and the third compensation amount and at a boundary position between the third compensation amount and the second compensation amount.

4. The method according to claim 2, wherein
the plurality of joints is operated based on a fourth compensation amount that changes more gently than the third compensation amount, in a case where a time from when the workpiece is brought into the non-gripping state to when the gripping part starts to move from the first teaching point to the second teaching point is shorter than a predetermined time.

5. The method according to claim 2, wherein
the plurality of joints is operated based on a fourth compensation amount that changes more gently than the third compensation amount, in a case where a distance between the gripping part and the first teaching point is shorter than a predetermined distance.

6. The method according to claim 1, wherein
the acceleration is set within a range of allowable acceleration of the arm, the acceleration being generated based on a change in the first compensation amount to the second compensation amount.

7. The method according to claim 1, wherein the arm comprises a shoulder connected to a base, a lower arm, a first upper arm, a second upper arm, wherein the shoulder is supported on the base so as to be turnable in a horizontal direction about a first joint of the plurality of joints, wherein the lower arm is supported on the shoulder so as to be turnable in a vertical direction about a second joint of the plurality of joints, wherein the first upper arm is supported on the lower arm so as to be turnable in the vertical direction about a third joint of the plurality of joints, wherein the second upper arm is supported on a tip of a first upper arm so as to be torsionally rotatable about a fourth joint of the plurality of joints, and wherein the wrist is supported on the second upper arm so as to be turnable in the vertical direction about a fifth joint of the plurality of joints.

* * * * *